Jan. 2, 1923.                                         1,441,176.
E. M. SABIN.
SELF VULCANIZING BOOT FOR TIRE CASINGS.
FILED OCT. 3, 1921.
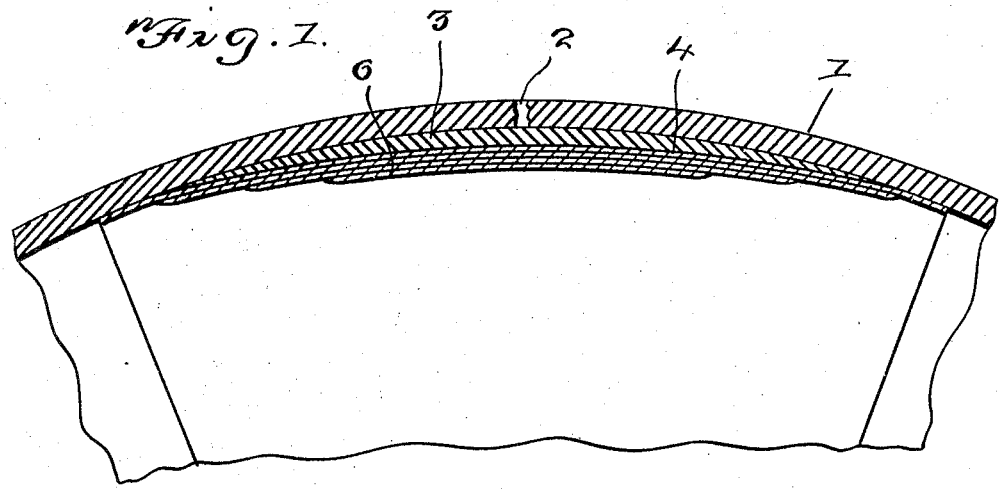
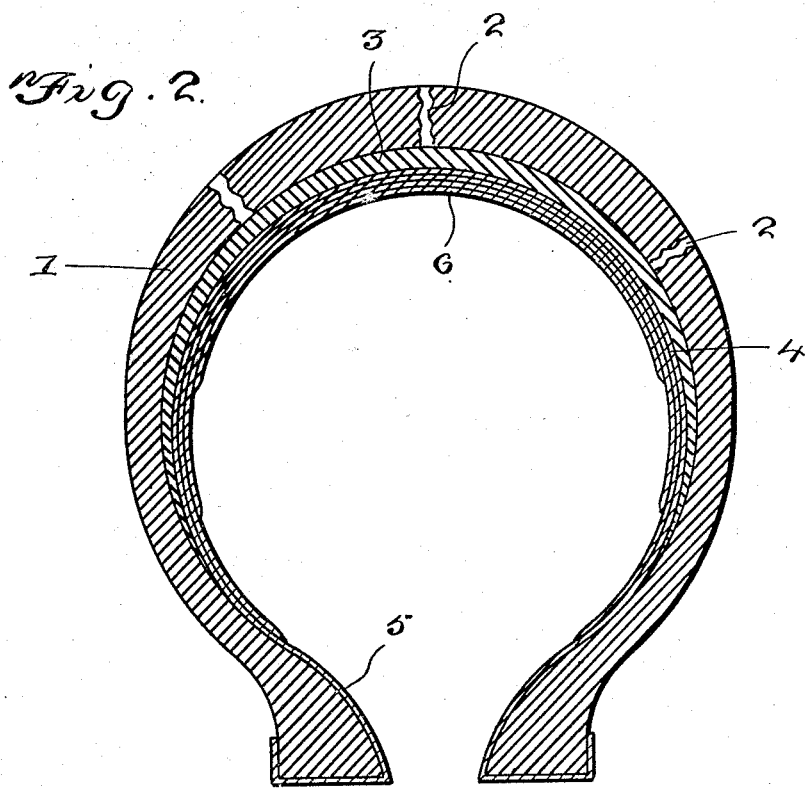

Patented Jan. 2, 1923.

1,441,176

UNITED STATES PATENT OFFICE.

EMERY M. SABIN, OF KANTNER, PENNSYLVANIA.

SELF-VULCANIZING BOOT FOR TIRE CASINGS.

Application filed October 3, 1921. Serial No. 505,072.

*To all whom it may concern:*

Be it known that I, EMERY M. SABIN, a citizen of the United States, residing at Kantner, in the county of Somerset and State of Pennsylvania, have invented new and useful Improvements in Self-Vulcanizing Boots for Tire Casings, of which the following is a specification.

My present invention has reference to a self-vulcanizing boot designed to be arranged in a tire casing to cover a cut or puncture therein and also designed to be compressed against the casing by an inflated inner tube, the outer face of the boot being treated with a cement whereby road pressure against the tire casing and the air pressure exerted by the inner tube will cause the boot to be securely attached to the inner face of the casing to remain a permanent part thereof and thus overcome the necessity of vulcanizing the tire when damaged.

A further object is to produce a self vulcanizing boot for tire casings which will be made in various sizes and proportions to accurately fit in varying sized tire casings, which shall be of a comparatively simple construction, cheaply manufactured, readily applied and which will be thoroughly efficient for the purpose for which it is devised.

A further object is to produce a self-vulcanizing boot for tire casings designed, when arranged therein to affix itself thereto in as efficient manner as were the same subjected to heat and which will materially reinforce the casing at and adjacent to cuts or punctures therein, and thereby materially prolong the life of the casing.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a fragmentary substantially vertical longitudinal sectional view through a portion of a tire casing having my improvement applied therein.

Figure 2 is a transverse sectional view through the tire casing and improvement.

In the showing of the drawings, a tire casing 1 is damaged by one or a plurality of cuts or punctures 2. The casing 1 is of the ordinary construction, and my improvement is designed to be received therein and to automatically attach itself thereto in a manner which will presently be apparent.

The improved boot essentially comprises an outer layer of tread rubber which is indicated by the numeral 3, and which, when in applied position, conforms itself to both the cross sectional and longitudinal contour of the casing 1. The outer tread rubber member 3 of the improvement is thickest at its center, and gradually decreases in thickness from its said center to its ends and edges, as clearly disclosed in Figures 1 and 2 of the drawings. By thickening the member or section 3 at the center thereof, it will be noted that the same will materially reinforce the tire casing at the portion thereof most susceptible to wear, that is, of course, the tread surface of the said casing, and consequently my improvement not only closes cuts or punctures, but materially strengthens the tire casing.

The tread rubber section 3 of the improvement has its outer face treated with a coating of suitable cement which will adhesively secure the same to the tire casing automatically and in as effective manner as were the same vulcanized thereto by the usual heated process. This is accomplished by the road pressure to which the tire casing is subjected, and the resistance of such road pressure by the inflated inner tube bearing against the inner face of the boot. As the inner tube is of the usual construction and does not form part of this invention, I have not deemed it necessary to illustrate the same.

Vulcanized or adhesively secured to the inner concaved face of the section 3 of the boot is a layer of tire building fabric 4. The tire building fabric is of a materially greater width than that of the member or section to which it is connected, the said fabric, as disclosed in Figure 2 of the drawings being of a size whereby the sides thereof may be brought over the sides of the casing outwardly over the beaded edges thereof and from thence against the outer face of the said beads so that the same may be tightly clamped beneath the bead, the tire bead and wheel rim being so arranged as to cover a hole or rim cut in the said fabric. The portions of the section 4 projecting beyond the outer member or section 3, I will, for the sake of convenience, hereinafter refer to as aprons, and have designated the same by the numeral 5 in the drawings. On the inner face of the section 4 there are adhesively secured or there may be vulcanized any desired number of other layers, the said layers being preferably constructed of the usual cloth and rubber, the inner layer, for distinction, being indicated by the numeral 6. The layers 6 gradually decrease in width from the inner to the outermost section thereof so that the inner contour of the boot is substantially in conformity to the cross sectional rounded contour of the inner tube when the latter is arranged in the casing.

The rubber tread surface of the boot, when vulcanized to the casing in the automatic manner above set forth, acts in a manner similar to the outer rubber tread surface of the casing. The section 3 of the boot prevents the entrance of moisture, sand or dirt through the cut or puncture to the interior of the casing, while the fabric portion of the boot reinforces and strengthens the said rubber section 3 so that the device, as a whole, will have a strength and durability substantially equal to the tread portion of a perfectly good tire casing.

Having described the invention, I claim:

A self vulcanizing boot designed to be arranged in a tire casing to cover punctures and to reinforce said casing, said boot comprising an outer layer of tread rubber, which conforms to the contour of the casing, the outer tread rubber member being thickest in its center and gradually decreasing in thickness from the center to its ends and edges, the tread rubber being adhesively secured to the inner concave face of the boot, a layer of tire building fabric arranged around the inner ends of the casing and being of a greater width than the outer tread member to which it is connected, the fabric being of a size whereby the sides thereof may be brought over the sides of the casing outwardly over the beaded edges thereof and from thence against the outer face of the beads for tightly clamping the same beneath the beads, a plurality of cloth and rubber layers secured on the inner face of its fabric, said layers gradually decreasing in width from the inner and outermost section thereof, so that the inner contour of the boot is substantially in conformity to the cross section around the contour of the inner tube when the latter is arranged in the casing.

In testimony whereof I affix my signature.

EMERY M. SABIN.